Patented Oct. 25, 1938

2,134,102

UNITED STATES PATENT OFFICE 2,134,102

DEHYDROCHLORINATION OF 1,1,2-TRI-CHLORPROPANE

Oliver W. Cass, Niagara Falls, N. Y., assignor to E. I. du Pont de Nemours & Company, Wilmington, Del., a corporation of Delaware No Drawing. Application May 13, 1935, Serial No. 21,300

5 Claims. (Cl. 260—654)

This application relates to the preparation of unsaturated chlorhydrocarbon derivatives from saturated chlorhydrocarbons by treatment with a basic material. More particularly it relates to the preparation of 1,1-dichlorpropene-1, $$CH_3.CH=CCl_2,$$

by reacting 1,1,2 trichlorpropane, $$CH_3.CHCl.CHCl_2,$$

with a base.

In a copending patent application, Ser. No. 19,954 filed May 6, 1935 by Arthur A. Levine and Oliver W. Cass, a process is disclosed for the preparation of isomeric mixtures consisting essentially of 1,1,2 trichlorpropane and 1,2,3 trichlorpropane by chlorinating propylene dichloride. In that application separation of the two isomers by distillation and condensation is also disclosed. This application relates to the further treatment of the 1,1,2 trichlorpropane isomer to prepare a chemical compound which is valuable for various purposes.

The compound 1,1,2 trichlorpropane, $$CH_3.CHCl.CHCl_2,$$

when pure, is a colorless liquid having an atmospheric boiling point of approximately 132° C. One of the objects of this invention is to react this liquid with basic material at a temperature below the boiling point of the trichlorpropane so that an atom of hydrogen and one of chlorine are split off, thereby resulting in an unsaturated compound having one atom less of chlorine.

From considerations of theoretical chemistry, any one of three isomers might result by the removal of hydrogen chloride from the trichlorpropane. These three isomers are $$CH_2=CH.CHCl_2;$$

$$CH_3CCl=CHCl,$$

and $$CH_3CH=CCl_2.$$

A consideration of chemical principles would also indicate that presumably a mixture of all three isomers in various proportions and amounts might result. Of the three possible isomers, 1,1-dichlorpropene-1, $CH_3CH=CCl_2$, is the one which might be considered least likely to result since it is a derivative of methyl ketene, $CH_3.CH=CO$, which is an extremely unstable compound. Surprisingly enough, however, it has been discovered that the isomers $$CH_2=CH.CHCl_2$$

and $CH_3.CCl=CHCl$ are not present in any appreciable amounts and that 1,1-dichlorpropene-1, the isomer which from theoretical considerations would be believed least likely to result, is produced in practically quantitative yields. I have found that the 1,1-dichlorpropene-2 and the 1,2-dichlorpropene-1, isomers are not produced since they are not found in recoverable amounts in the reaction product and the 1,1 chlorpropene-1 isomer is formed in yields which are normally well over 90%.

As a basic material I have used aqueous solutions of sodium and potassium hydroxide and aqueous solutions of the alkali earth metal hydroxides such as calcium hydroxide. Any basic material is suitable. Thus I have used with complete success, alcoholic solutions of caustic soda and caustic potash. I prefer, however, for most purposes to use one of the relatively less expensive alkali metal bases dissolved in some suitable solvent such as alcohol or water. Solutions of soda ash (sodium carbonate) in various media will also be found entirely satisfactory for the purposes of the process.

While the process of this reaction is best carried out in the liquid phase, it is also possible to remove an atom of chlorine and one atom of hydrogen from 1,1,2 trichlorpropane and convert it to an unsaturated compound by the use of a gas phase reaction. Thus by vaporizing the 1,1,2 trichlorpropane and passing the vapors over a catalyst comprising any of the common hydrogen chloride-removing catalysts, such as barium chloride on charcoal, commercially important yields of 1,1-dichlorpropene-1 have been obtained. Other suitable catalysts are the halides particularly the chlorides of various metals such as those of Ni, Cu, Pb, Cd and Fe. When using barium chloride on charcoal the process is best carried out at an elevated temperature of about 300° C. or one within the temperature range 250 to 350° C. In this reaction, as contrasted with the liquid phase reaction, the chlorine is removed as hydrogen chloride and not as a salt of the base, as when utilizing a liquid phase process.

But little need be said about the precise details of the process, other than that it is preferred that it be carried out in the liquid phase. The 1,1,2 trichlorpropane is introduced into a vessel containing a strong solution of the base dissolved in a suitable solvent such as water or alcohol. While the reaction will proceed at room temperature, it is preferable to maintain a somewhat elevated temperature, one somewhere between the boiling point of 1,1-dichlorpropene-1 (which is 77-78° C.) and the boiling point of the 1,1,2 trichlorpropane (132° C.). However, since there is water present and the 1,1-dichlorpropene-1 will steam distill at a temperature below 77° C., it is not necessary to maintain a temperature that high. There are two procedures of value in carrying out this liquid phase reaction. A reflux condenser may be attached to the vessel in which the reaction is carried out, in which case the 1,1-dichlorpropene-1, which is distilled off, will be condensed and flow back into the vessel. Or, it is possible to attach to the vessel a fractionation column in which the 1,1-dichlorpropene-1 will be distilled off, condensed, and recovered as a liquid outside of the reaction vessel. Yields of about the same uniformly high percentages are obtained by the use of either method.

In practice, as I have indicated, the 1,1,2 trichlorpropane is preferably added to the basic material dissolved in a solvent. Heat is then applied and the mixture is thoroughly stirred. The elevated temperature is maintained for about three hours during which time the agitation is continuous. At the end of this period, if a reflux condenser has been used, the oil may be readily separated from the basic material since it will rise to the top of the vessel. On the other hand, if a fractionation column has been used, the 1,1-dichlorpropene-1 will be found in the receiver attached to the condenser of the fractionation column.

1,1,-dichlorpropene-1 is readily separated from unreacted 1,1,2 trichlorpropane and any other by-products in the reaction mixture since it has a boiling point of 77-78° C. while the boiling point of 1,1,2 trichlorpropane is 132° C. High yields are obtained by the process, the yields being in the neighborhood of 90% or over.

The reaction occurring, using sodium hydroxide as a typical basic material, may be expressed as follows:

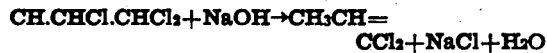

When using a catalytic material such as BaCl₂ on a charcoal carrier, the reaction occurring is probably as follows:

It is thus evident that a saturated chlorinated hydrocarbon is converted into an unsaturated chlorinated hydrocarbon containing one atom less of chlorine by the removal of hydrogen chloride in the process disclosed. As previously suggested, it is indeed surprising that the 1,1-dichlorpropene-1 isomer is produced in substantial quantitative yields and that the two other isomers $CH_2=CH.CHCl_2$ and $CH_3.CCl=CHCl$ are practically completely absent. Moreover when it is considered that the 1,1-dichlorpropene-1 isomer $CH_3.CH=CCl_2$ is a derivative of methyl ketene, $CH_3.CH=CO$, and would normally be expected to be unstable, the preparation of this product by removal of hydrogen chloride from trichlorpropane is indeed remarkable.

As illustrative examples of the process the following may be given:

*Example 1*

A solution of 400 grams of 95% sodium hydroxide and 2500 cc. of water was placed in a 5 liter flask. The flask was equipped with a stirrer and a reflux condenser. Into the flask 1475 grams of 1,1,2 trichlorpropane was then introduced.

The mixture was thoroughly stirred and heated until an oil began to reflux back in the condenser, the mixture in the reaction vessel being maintained at a temperature of about 75° C. The elevated temperature in the reaction vessel was maintained for three hours during which period the mixture was stirred constantly. At the end of this period the oil was separated from the slightly basic aqueous solution, dried, and carefully fractionated.

The product was 953 grams of 1,1-dichlorpropene-1, which has a boiling point of about 77-78° C. 94 grams of the residue consisted of unreacted 1,1,2 trichlorpropane. Based upon the quantity of sodium hydroxide consumed, the yield of 1,1 chlorpropene-1 was 94% theoretical.

*Example 2*

In these operations a flask equipped with a stirrer and a short fractionation column was used. The same weights of materials indicated in Example 1 were reacted, i. e. 400 grams of 95% sodium hydroxide in 2500 cc. of water and 1475 grams of the trichlorpropane. A condenser was placed in communication with the fractionation column so that material passing thru the column and condenser would flow into a receiving vessel.

The reaction vessel and its contents were heated with constant stirring to a temperature of about 78°-85° C. at which temperature liquid began to pass through the fractionation column and condenser to the receiving vessel. After about three hours no more oily material remained in the reaction vessel. The oil was separated from the aqueous layer in the receiver, dried and fractionated.

The product consisted of 908 grams of 1,1-dichlorpropene-1 boiling at 77-78° C. and 114 grams of unreacted 1,1,2 trichlorpropane. The yield of 1,1-dichlorpropene-1, based upon the amount of sodium hydroxide consumed, was 89% of the theoretical.

*Example 3*

In this example the reaction was carried out at room temperature and without external heating. A solution of 56 grams of potassium hydroxide in 800 cc. of ethyl alcohol was placed in a 1-liter flask. To the potassium hydroxide was then added 147.5 grams of 1,1,2 trichlorpropane. A rise in temperature of the flask contents was evident at once and a white precipitate of potassium chloride immediately formed.

The precipitated potassium chloride was removed by filtration and the alcoholic filtrate was diluted with water. The oily layer which separated was removed, washed with water, dried and distilled. A fraction of 51 grams boiling at 75-85° C. was secured. The greater portion of this fraction was 1,1-dichlorpropene-1, boiling at 77.5° C. The yield was 67% of the theoretical based on the quantity of potassium hydroxide used up in the reaction.

*Example 4*

In this example 590 grams of 1,1,2 trichlorpropane were stirred for six hours in a flask fitted with a reflux condenser at a temperature of 85° C. with a 20% excess of a 20% calcium oxide suspension in water. At the end of this period the oil was removed by steam distillation, separated from the aqueous layer, dried and fractionated.

The product consisted of 195 grams of 1,1-dichlorpropene-1 and 253 grams of unreacted 1,1,2 trichlorpropane. The yield of 1,1-dichlorpropene-1, based upon the amount of 1,1,2 trichlorpropane used up in the reaction was 77% of the theoretical.

*Example 5*

In this example hydrogen chloride was removed from the 1,1,2 trichlorpropane by the use of the hydrogenchloride-removing catalyst barium chloride.

A tube was packed with charcoal on which the barium chloride was retained. The tube was fitted at the upper end with an inlet bulb which could be filled with the trichlorpropane. A stopcock at the lower end of this bulb could be adjusted to regulate the flow of the liquid through the tube.

The tube was heated to a temperature of 300-350° C. and the 1,1,2 trichlorpropane permitted to flow at a relatively slow rate through the tube. Hydrogen chloride gas was evolved and passed out through a vent in the upper end of the column. The lower end of the tube, which was in communication with a condenser, served to collect the reaction product.

In the condenser at the lower end of the heated tube an oil separated which was washed with water and distilled. From this product 30 grams of 1,1-dichlorpropene-1 boiling at a temperature of 77-78 C. was obtained. The isomers 1,1 dichlorpropene-2 and 1,2 dichlorpropene-1 could not be found in the reaction product.

It is thus evident that the invention resides in the prepaartion of 1,1 dichlorpropene-1 in substantially quantitative yields by reacting 1,1,2 trichlorpropane with a basic material or by splitting off hydrogen chloride from the trichlorpropane by a catalytic process utilizing a hydrogen chloride-removing catalyst. The invention is one of broad general utility and is not to be restricted to the specific times, temperatures, conditions, chemical agents, or amounts which have been disclosed as illustrative in the preceding typical examples. Various modifications of the invention may come within its purview and the scope thereof is to be determined solely in accordance with the appended claims.

I claim:

1. A process of preparing 1,1-dichlorpropene-1 which comprises reacting 1,1,2 trichlorpropane with a basic compound of a metal of the group consisting of the alkali metals and the alkaline earth metals.

2. A process of preparing 1,1-dichlorpropene-1 which comprises reacting 1,1,2 trichlorpropane with a basic compound of a metal of the group consisting of the alkali metals and the alkaline earth metals at a temperature below the boiling point of 1,1,2 trichlorpropane.

3. A process for preparing 1,1-dichlorpropene-1 which comprises reacting 1,1,2 trichlorpropane in the liquid phase with a basic compound of a metal of the group consisting of the alkali metals and the alkaline earth metals.

4. A process for preparing 1,1-dichlorpropene-1 which comprises reacting 1,1,2 trichlorpropane in the liquid state with a solution of sodium hydroxide.

5. A process for preparing 1,1-dichlorpropene-1 which comprises reacting 1,1,2 trichlorpropane in the liquid state at an elevated temperature with a basic compound of a metal of the group consisting of the alkali metals and the alkaline earth metals dissolved in a suitable solvent.

OLIVER W. CASS.